United States Patent
Marks et al.

(10) Patent No.: US 10,427,362 B2
(45) Date of Patent: Oct. 1, 2019

(54) MOLDABLE NATURAL FIBER NONWOVEN WIRE HARNESS TROUGH AND METHOD OF CONSTRUCTION THEREOF

(71) Applicant: FEDERAL-MOGUL POWERTRAIN, LLC, Southfield, MI (US)

(72) Inventors: Philip E. Marks, Chester Springs, PA (US); Eric Staudt, Reading, PA (US); Ritesh Mehbubani, Telford, PA (US); Ali Khosroshahi, Malvern, PA (US)

(73) Assignee: Federal-Mogul Powertrain LLC, Southfield, MI (US)

( * ) Notice: Subject to any disclaimer, the term of this patent is extended or adjusted under 35 U.S.C. 154(b) by 0 days.

(21) Appl. No.: 15/582,984

(22) Filed: May 1, 2017

(65) Prior Publication Data
US 2017/0232689 A1 Aug. 17, 2017

Related U.S. Application Data

(62) Division of application No. 14/859,632, filed on Sep. 21, 2015, now Pat. No. 9,637,071.
(Continued)

(51) Int. Cl.
*B29C 70/40* (2006.01)
*B29C 70/46* (2006.01)
(Continued)

(52) U.S. Cl.
CPC .......... *B29C 70/465* (2013.01); *B29C 43/003* (2013.01); *B29C 43/021* (2013.01);
(Continued)

(58) Field of Classification Search
CPC .............. Y10T 428/24198; H02G 3/04; H02G 3/0406; H02G 3/0437; B29C 43/003;
(Continued)

(56) References Cited

U.S. PATENT DOCUMENTS 4,864,082 A 9/1989 Ono et al.
9,362,726 B2 * 6/2016 Takata ................... H01B 7/292
(Continued)

FOREIGN PATENT DOCUMENTS

DE 20300098 U1 3/2003
JP H10095264 A 4/1998
(Continued)

*Primary Examiner* — Alexander S Thomas
(74) *Attorney, Agent, or Firm* — Robert L. Stearns; Dickinson Wright, PLLC

(57) ABSTRACT

A nonwoven trough and method of construction thereof are provided. The nonwoven trough includes at least one nonwoven wall formed from a mixture of bonded natural cellulosic fibers and thermoplastic fibers. The at least one nonwoven wall extends along a longitudinal axis and has a midsection and opposite end portions. The midsection has a base and a pair of walls extending upwardly from the base to provide the midsection with a generally U-shaped cross-section taken generally transversely to the longitudinal axis. At least one flange extends laterally from the at least one nonwoven wall, wherein the flange is configured for attachment to a vehicle member.

15 Claims, 8 Drawing Sheets

Related U.S. Application Data

(60) Provisional application No. 62/052,798, filed on Sep. 19, 2014.

(51) Int. Cl.

| | | |
|---|---|---|
| *B60R 16/02* | (2006.01) | |
| *B32B 5/02* | (2006.01) | |
| *B32B 3/28* | (2006.01) | |
| *B32B 3/30* | (2006.01) | |
| *B32B 5/26* | (2006.01) | |
| *B29C 43/02* | (2006.01) | |
| *B29C 43/00* | (2006.01) | |
| B29K 1/00 | (2006.01) | |
| B29K 23/00 | (2006.01) | |
| B29K 301/12 | (2006.01) | |
| B29K 201/00 | (2006.01) | |
| B29K 311/10 | (2006.01) | |
| B29L 31/30 | (2006.01) | |
| B29C 70/42 | (2006.01) | |

(52) U.S. Cl.
CPC ............... *B32B 3/28* (2013.01); *B32B 3/30* (2013.01); *B32B 5/022* (2013.01); *B32B 5/028* (2013.01); *B32B 5/26* (2013.01); *B60R 16/0215* (2013.01); *B29C 70/42* (2013.01); *B29C 2043/022* (2013.01); *B29K 2001/00* (2013.01); *B29K 2023/04* (2013.01); *B29K 2023/10* (2013.01); *B29K 2201/00* (2013.01); *B29K 2301/12* (2013.01); *B29K 2311/10* (2013.01); *B29L 2031/3005* (2013.01); *B29L 2031/3055* (2013.01); *B32B 2262/0253* (2013.01); *B32B 2262/062* (2013.01); *B32B 2605/003* (2013.01); *Y10T 428/24198* (2015.01)

(58) Field of Classification Search
CPC ............... B29C 43/021; B29C 70/465; B29C 2043/022; B32B 3/28; B32B 3/30; B32B 5/028

See application file for complete search history.

(56) References Cited

U.S. PATENT DOCUMENTS

| | | | |
|---|---|---|---|
| 9,590,403 B2* | 3/2017 | Jackson, Jr. | H02G 3/0431 |
| 2011/0098463 A1 | 4/2011 | Yoshitani et al. | |
| 2014/0272343 A1 | 9/2014 | Mehbubani et al. | |
| 2015/0053479 A1 | 2/2015 | Takata et al. | |

FOREIGN PATENT DOCUMENTS

| | | |
|---|---|---|
| JP | 2013207873 A | 10/2013 |
| WO | 2013145960 A1 | 10/2013 |
| WO | 2014041895 A1 | 3/2014 |
| WO | 2014145457 A1 | 9/2014 |

* cited by examiner

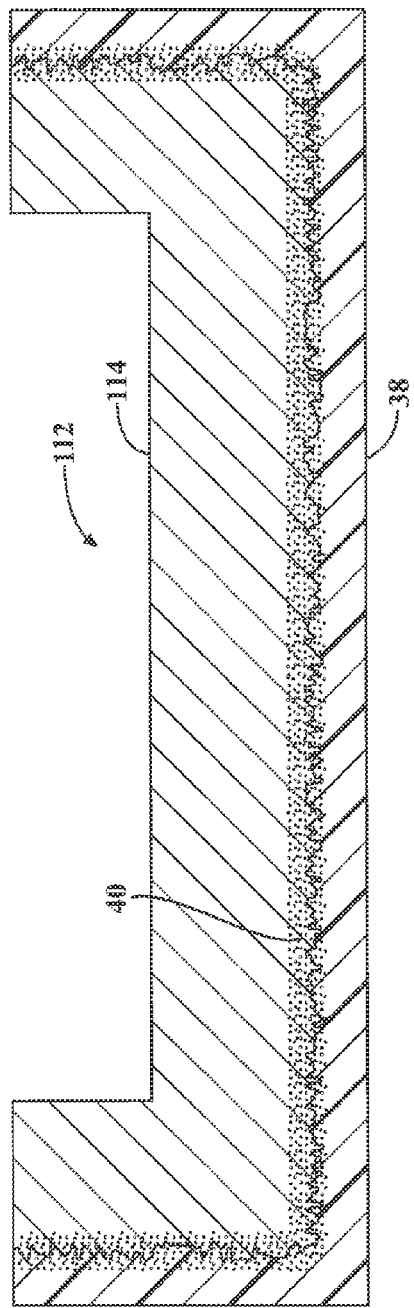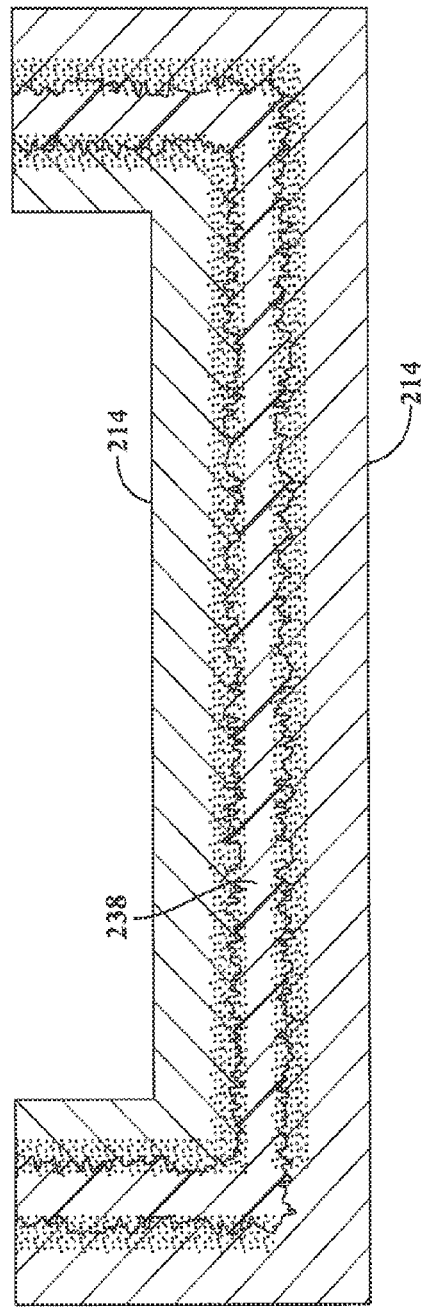

MOLDABLE NATURAL FIBER NONWOVEN WIRE HARNESS TROUGH AND METHOD OF CONSTRUCTION THEREOF

CROSS-REFERENCE TO RELATED APPLICATION

This U.S. Divisional Application claims the benefit of U.S. Utility application Ser. No. 14/859,632, filed Sep. 21, 2015, now U.S. Pat. No. 9,637,071 which claims the benefit of U.S. Provisional Application Ser. No. 62/052,798, filed Sep. 19, 2014, both of which are incorporated herein by reference in their entirety.

BACKGROUND OF THE INVENTION

1. Technical Field

This invention relates generally to troughs and channels for bundling, routing and protecting elongate members.

2. Related Art

Wire harnesses used in vehicles typically need to be routed within troughs or channels to properly direct and maintain the wire harness in its intended location, and to protect the wire harness from unwanted exposure. The known troughs are commonly made from extruded and injection molded plastics, and thus, are relatively rigid and inflexible. In addition, being extruded, the troughs have a constant cross-sectional profile, and thus, are not able to adapt in size and shape between neighboring areas. Accordingly, multiple troughs having different configurations are sometimes used to support and guide a single wire harness. Other structural and semi structural components, especially for the automotive industry, are also formed via extrusion and injection molding processes and made from petroleum-based materials, such as plastics. These end products, in addition to having a uniform, rigid cross-section, have a high weight-to-strength ratio. In addition to, and contributing to weight issues, injection molding processes typically come with inherent limitations on how thin finish parts can be, due in large part to the gates required in injection molding processes to allow the molten material to flow throughout the mold cavity. Further limitations exist in the ability to customize the physical properties of a finish product throughout different regions of the product when made of relatively rigid plastics or metal materials, which can inhibit the ability of the finished product to provide a combination of rigidity, softness and flexibility desired over different regions of the product often desired in some applications. Industries, including the automotive, aircraft and aerospace industries in particular, are constantly looking to reduce weight and increase strength of parts, and thus, are looking for high strength-to-weight ratio structural materials. This is being driven largely by the need to produce lighter vehicles, which in turn result in increased fuel and performance efficiencies. Further yet, industry is continually looking for structural materials that are environmentally friendly and/or reusable, such that their end of life does not result in a negative impact on the environment.

SUMMARY OF THE INVENTION

In accordance with one aspect of the invention, a thermoformed nonwoven trough includes at least one nonwoven wall formed from a mixture of bonded natural cellulosic fibers and thermoplastic fibers. The at least one nonwoven wall extends along a longitudinal axis and has a midsection and opposite end portions. The midsection has a base and a pair of walls extending upwardly from the base to provide the midsection with a generally U-shaped cross-section taken generally transversely to the longitudinal axis. The end portions each have a base and at least one laterally extending flange, wherein the flanges are configured for attachment to a vehicle member.

In accordance with another aspect of the invention, the nonwoven trough can further include a fastener operably fixed to the at least one of the laterally extending flanges.

In accordance with another aspect of the invention, the nonwoven trough can further include a living hinge extending between the flanges and the base of the end portions.

In accordance with another aspect of the invention, the natural cellulosic fibers can include kenaf and the thermoplastic fibers can include polypropylene, polyethylene or modified types thereof.

In accordance with another aspect of the invention, the at least one nonwoven wall can have regions of varying thickness.

In accordance with another aspect of the invention, the nonwoven trough can further include a scrim layer bonded to an outer surface of at least one nonwoven, with the scrim layer being at least partially diffused into the nonwoven during a thermoforming process to form an alloy region containing material of both the at least one nonwoven and the scrim layer.

In accordance with another aspect of the invention, the nonwoven trough can be made from a plurality of nonwoven layers and further include a scrim layer sandwiched between a pair of nonwovens, with the scrim layer being at least partially diffused into each of the nonwovens during a thermoforming process to form a pair of alloy regions on opposite sides of the scrim layer, wherein the alloy regions contain material from separate ones of the nonwoven webs and the scrim layer.

In accordance with another aspect of the invention, the nonwoven trough can include a cover attached to one of the sidewalls, with the cover being configured to extend over the base into abutment with an opposite one of the sidewalls.

In accordance with another aspect of the invention, the cover can be attached to the one sidewall via a living hinge.

In accordance with another aspect of the invention, a fastener can be provided to facilitate maintaining the cover in a closed position, wherein the fastener can include a male fastener portion formed as a monolithic piece of material with the nonwoven wall and a female fastener portion formed as a monolithic piece of material with the nonwoven wall.

In accordance with another aspect of the invention, the sidewall can include a lip extending outwardly therefrom to provide enhance structural integrity to the trough.

In accordance with another aspect of the invention, a method of constructing a nonwoven trough is provided. The method includes blending natural cellulosic fibers and thermoplastic polymeric fibers together to form a mixture, and then forming at least one nonwoven web from the mixture. The method further includes forming a nonwoven layer by bonding the fibers together, and hot compression molding the at least one nonwoven layer to form a nonwoven trough extending along a longitudinal axis, with the nonwoven trough having a midsection and opposite end portions. Further, forming the midsection having a base and a pair of walls extending upwardly from the base to provide the midsection with a generally U-shaped cross-section taken generally transversely to the longitudinal axis. Further yet, forming each of the end portions having a base and at least one laterally extending flange configured for attachment to a vehicle member.

In accordance with another aspect of the invention, the method can further include operably fixing a fastener to the laterally extending flanges.

In accordance with another aspect of the invention, the method can further include forming a living hinge extending between the at least one flange and the base of the end portion.

In accordance with another aspect of the invention, the method can further include providing the natural cellulosic fibers including kenaf and the thermoplastic polymeric fibers including polypropylene, polyethylene or modified types thereof.

In accordance with another aspect of the invention, the method can further include forming the thermoformed trough having regions of varying thickness.

In accordance with another aspect of the invention, the method can further include bonding a scrim layer to an outer surface of the at least one nonwoven layer and diffusing the scrim layer into the at least one nonwoven layer to form an alloy region containing material of both the at least one nonwoven layer and the scrim layer.

In accordance with another aspect of the invention, the method can further include forming an outer surface of the trough with the scrim layer.

In accordance with another aspect of the invention, the method can further include sandwiching a scrim layer between a pair of the at least one nonwoven layers and diffusing the scrim layer into each of the nonwoven layers to form a pair of alloy regions on opposite sides of the scrim layer, with the alloy regions containing material from separate ones of the nonwoven layers and the scrim layer.

In accordance with another aspect of the invention, the method can further include forming a cover attached to one of the sidewalls and configuring the cover to extend over the base into abutment with an opposite one of the sidewalls.

In accordance with another aspect of the invention, the method can further include forming a living hinge between the cover and the one sidewall to which the cover is attached.

In accordance with another aspect of the invention, the method can further include forming a fastener having at least a portion formed as a monolithic piece of material with at least one of the cover and the sidewall against which the cover abuts, and configuring the portion of the fastener to be fastened to the other of the cover or the sidewall to against which the cover abuts.

In accordance with another aspect of the invention, the method can further include forming the fastener having a male fastener portion formed as a monolithic piece of material with one of the cover and the sidewall against which the cover abuts and forming the fastener having a female fastener portion formed as a monolithic piece of material with the other the cover and the sidewall against which the cover abuts, with the male fastener portion being configured for releasable attachment within the female fastener portion.

In accordance with another aspect of the invention, the method can further include forming a lip extending outwardly from at least one of the sidewalls to enhance the structural integrity of the trough against unwanted sagging and twisting.

In accordance with another aspect of the invention, the method can further include bonding at least one of the at least one flange to the base during the compressing molding.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

FIG. 4 is a cross-sectional view similar to FIG. 3 of a nonwoven wall used to mold a trough in accordance with another aspect of the invention;

FIG. 5 is a cross-sectional view similar to FIG. 3 of a nonwoven wall used to mold a trough in accordance with yet another aspect of the invention;

DETAILED DESCRIPTION OF PRESENTLY PREFERRED EMBODIMENTS

Figure 1:
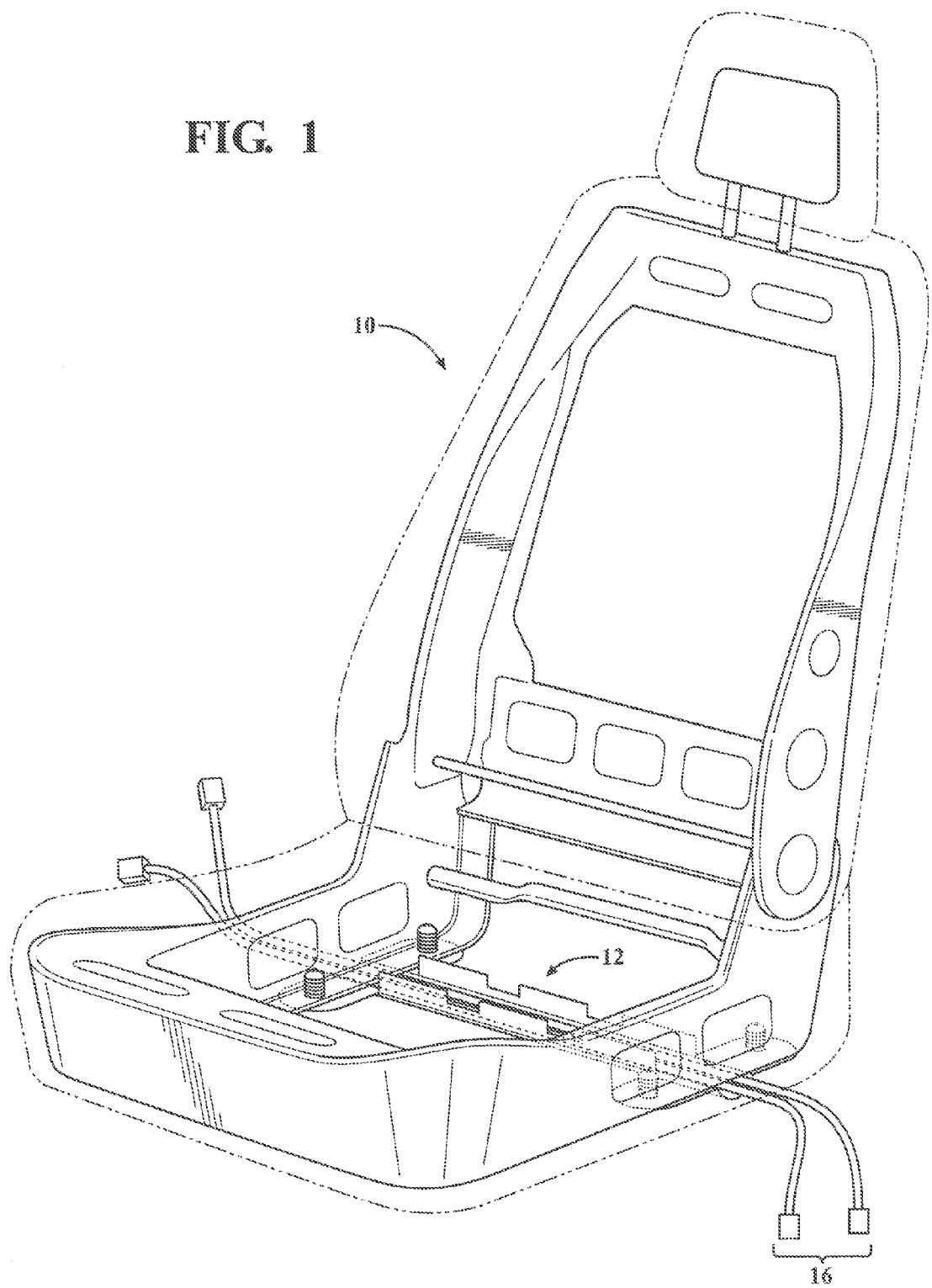
FIG. 1 is a schematic view of a vehicle seat including a wire harness supported and guided therethrough via a trough constructed in accordance with one aspect of the invention.
Figure 2:
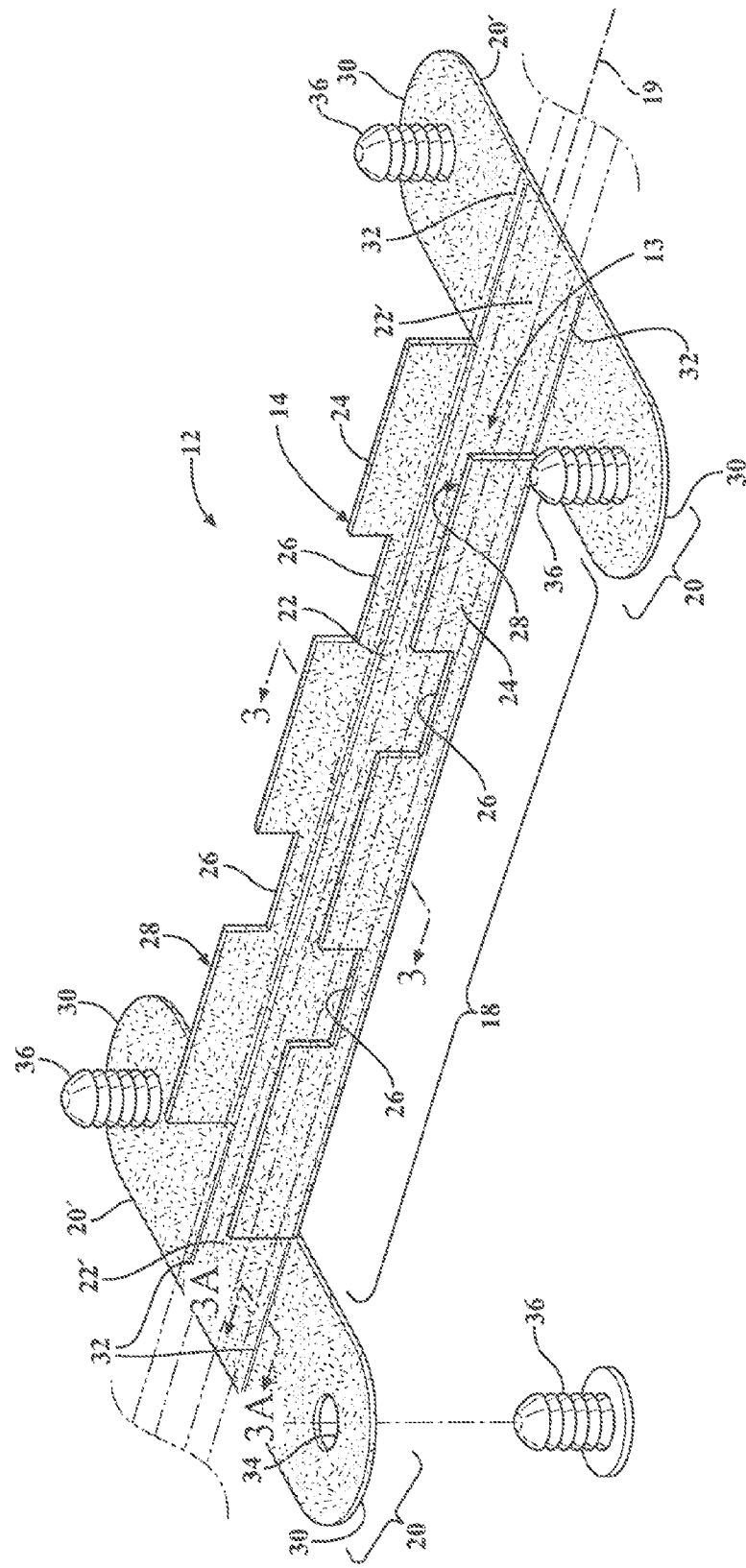
FIG. 2 is a perspective view of the trough of FIG. 1.
Figure 3:
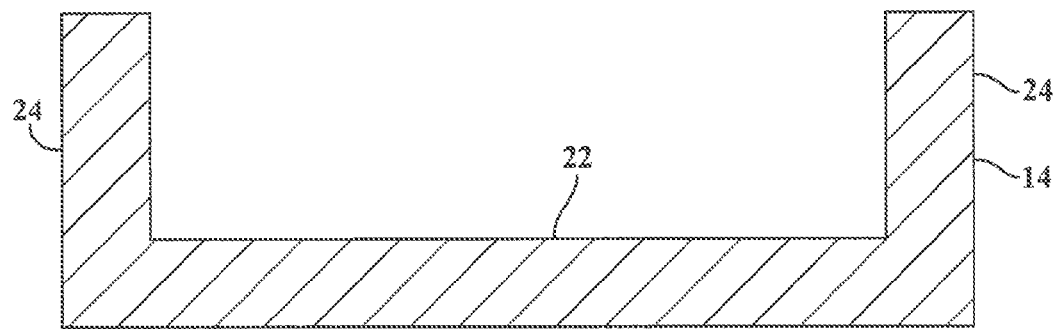
FIG. 3 is cross-sectional view taken generally along the line 3-3 of FIG. 2 showing a nonwoven wall constructed in accordance with one aspect of the invention.

Referring in more detail to the drawings, FIG. 1 illustrates a vehicle seat 10 including an improved through channel, referred to hereafter as trough 12 (FIGS. 1 and 2), constructed in accordance with one aspect of the invention from a wall 14 including a nonwoven layer, (various presently preferred embodiments of the walls shown in FIGS. 3-5). The trough 12 is configured having at least one passage or channel 13 for bundling, routing and protecting one or more elongate members, such as wires and control systems (electronic, hydraulic, pneumatic, etc.), and shown as wiring harnesses 16, by way of example and without limitation, in a vehicle in a variety of applications, e.g. headliners, trunk liners, beneath passenger compartment flooring, with the seat application being just one of many potential applications. The wall 14 of nonwoven material includes natural fibers along with thermoplastic fibers to provide the wall 14 with reduced weight and enhanced flexibility as compared to conventional injection molded plastic through channels, as well as compared to channels made of metal. The trough 12, in addition to automotive vehicles, can be used in a range of different types of vehicles including, by way of example and without limitation, boats, trains, off road vehicles, airplanes, spacecraft, etc.

Figure 3A:
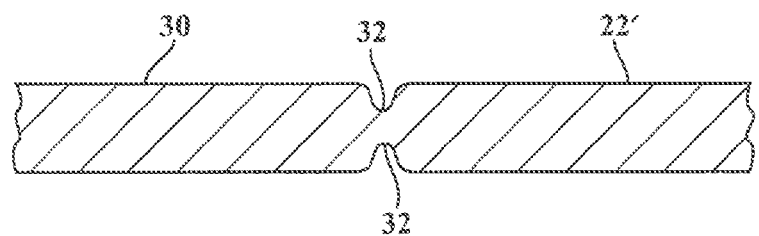
FIG. 3A is a cross-sectional view taken generally along the line 3A-3A of FIG. 2 showing a living hinge of the nonwoven wall.
Figure 3B:
FIG. 3B is a cross-sectional view of a nonwoven wall used to mold a trough in accordance with another aspect of the invention.
Figure 8:
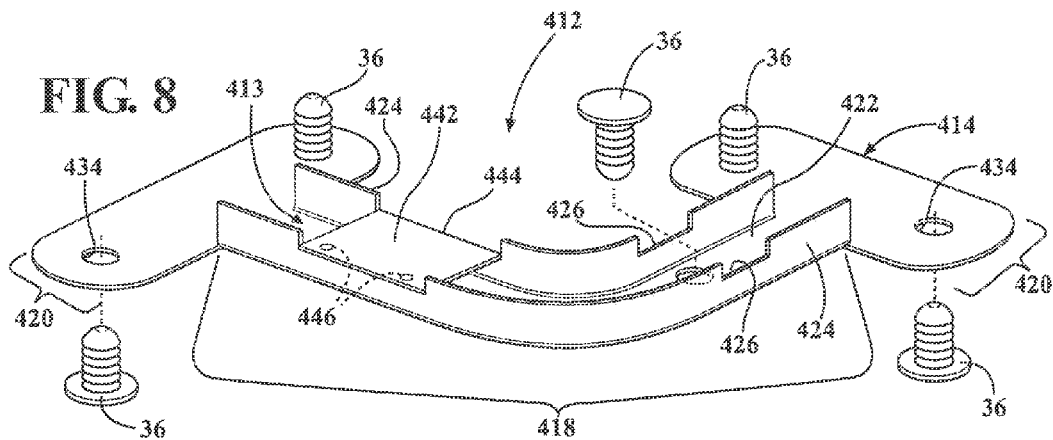
FIG. 8 is a plan view of a trough constructed in accordance with another aspect of the invention.
Figure 9:
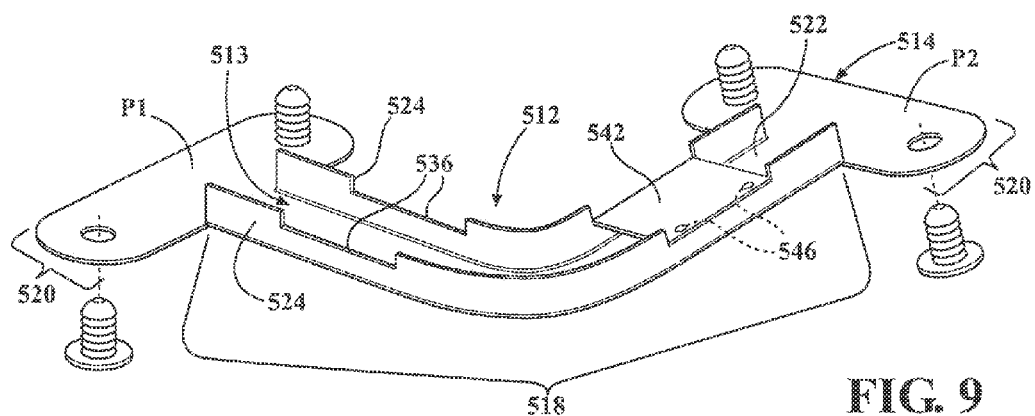
FIG. 9 is a perspective view of a trough constructed in accordance with yet another aspect of the invention.
Figure 10:
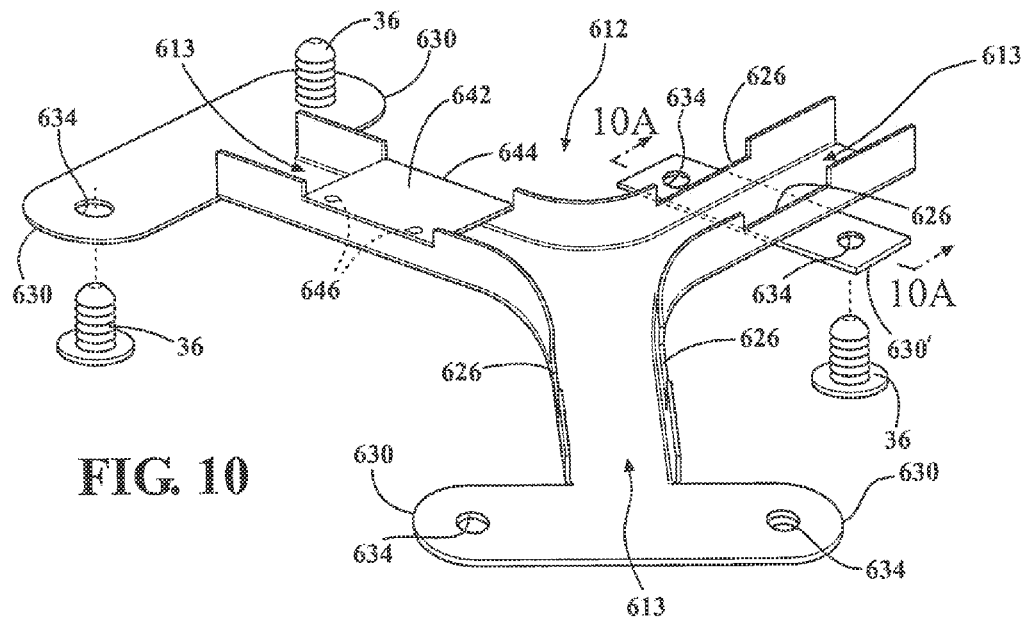
FIG. 10 is a plan view of a trough constructed in accordance with yet another aspect of the invention.
Figure 10A:
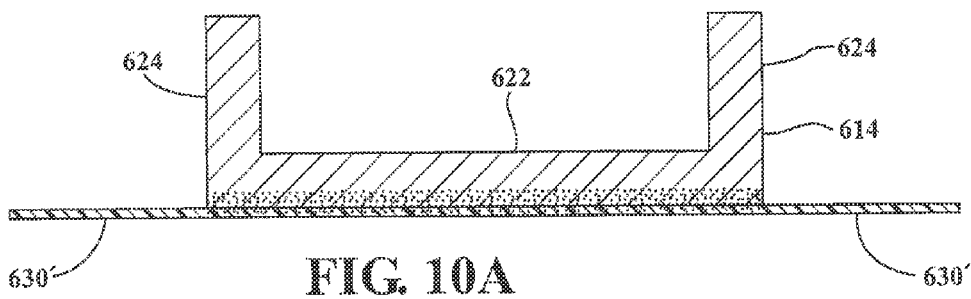
FIG. 10A is a cross-sectional view taken generally along the line 10A-10A of FIG. 10.

In one exemplary embodiment, the trough 12 includes a mid-portion 18 which extends longitudinally along a longitudinal axis 19 between a pair of end portions 20, which are located immediately adjacent opposite free ends 20' of the end portions 20. The mid-portion 18 is generally U-shaped as viewed in lateral cross-section (FIG. 3), as a result of being thermoformed in a compression molding process, with a base 22 and a pair of generally parallel sidewalls 24 at least partially forming the channel 13. Each of the sidewalls 24 can include features to facilitate conforming to the envelope of the intended application, with the features being shown here, by way of example and without limitation, as one of more pairs of scallops or notches 26 which are shown spaced opposite from one another, and if a plurality of pairs of notches 26 are provided, the pairs are spaced longitudinally from one another, with the notches 26 extending downwardly toward the base 22 from an uppermost top edge 28. The opposed notches 26 can function for receipt of a fastener thereover, such as a strip of adhesive tape or other types of fasteners, including tie-wraps and the like, to facilitate maintaining the elongate member(s) 16 against movement within the trough 12, thereby inhibiting or preventing vibration of the elongate member(s) 26 within the trough 12, thus, eliminating a potential source for noise. Each of the end portions 20 include a base 22' and a pair of wings, also referred to as protrusions, extensions or flanges 30, which extend laterally from the base 22'. The flanges 30 are hingedly connected with the bases 22' of the end portions 20 via reduced thickness living hinges 32 (FIG. 3A), and thus, the flanges 30 are able to be freely flexed and pivoted relative to the bases 22', thereby facilitating attachment of the flanges 30 to the respective vehicle body panel or member. Each of the flanges 30 can have an aperture 34 formed therethrough, such as in a cutting or punching operation, for receiving a connecting device or fastener 36 (such as, for example, various clipping or snapping devices commonly used in vehicle interior trim applications) for attaching the trough 12 to a member of the vehicle, e.g., a body panel, frame member, and the like. It should be appreciated that the geometrical shape of the trough 12 may be configured as desired in manufacture, corresponding to the constraints or envelope of the location in which the trough 12 is to be fixed. Some additional embodiments are shown in FIGS. 8 and 8-10, which are discussed in more detail hereafter. As such, the shape of the trough 12 can be thermoformed having any desired outer peripheral shape, and in addition, the thickness of the wall of the trough 12 can be formed having a uniform, constant thickness over its entirety, or the wall 14' of the trough can be formed having a varying thickness in select regions (FIG. 3B), as desired, including stepped and/or continuously varying thicknesses, to provide the different regions with different physical properties, i.e. strength, flexibility. Accordingly, some regions of the trough 12 can be formed having an increased thickness relative to other regions, thereby providing the wall 14 with regions of increased stiffness and rigidity, while other regions can be formed having a relatively reduced thickness, thereby providing the wall with regions of increased flexibility.

The nonwoven wall 14, also referred to as nonwoven sheet or layer, is first constructed as a nonwoven web. The web is constructed of in part of natural cellulosic fibers, such as, natural bast fibers including bamboo, kenaf, flax, hemp, jute, and the like. Accordingly, the fibers used are naturally renewable, and have a low carbon footprint compared to petroleum based fibers, which are not used, or if used, are used sparingly. In addition to the reduced or eliminated use of petroleum based materials being better for the environment, it also provides for price stability as a result of the material costs being more predictable and less dependent on the historically volatile price of oil. Moreover, the reduced weight of the improved trough 12 contributes to improved performance and fuel economy for the resulting vehicle, thereby also providing the vehicle with a lower carbon footprint.

In accordance with one aspect of the invention, as shown schematically in FIG. 3, the material of the trough wall 14 includes fibrous material, made of natural bast fibers, and in one sample, by way of example and without limitation, about 50 wt % kenaf fiber was used and approximately 50 wt % thermoplastic fibers, such as polypropylene fibers, by way of example and without limitation, was used. In the manufacturing process, the kenaf and polypropylene fibers are blended, a nonwoven web is made from the mix, and then the nonwoven web is cut to size, heated, thermocompress molded, cooled, and then, if needed to provide the finished configuration of the trough 12, optionally trimmed and punched to provide the finished wall 14. This process provides the resulting wall 14 with structural integrity and flexibility, both longitudinal and lateral, while also providing it with the desired configuration, whether uniform or varying in cross-sectional profile. If varying in cross-sectional thickness, different regions can be compressed during the compression molding process more than other regions, such as when forming the living hinges, to providing the desired features and structural properties in selected regions of the trough 12. As such, the ability to make a precise shape and configuration of the trough 12 is made relatively easy via the compress molding operation. The resulting wall 14 includes air voids or pockets, particularly in regions less compressed, wherein the air voids provide the resulting wall 14 with a reduced density and weight as compared to conventional injection molded plastic through channels or metal channels. Despite the air pockets or voids, the nonwoven wall 14 has been found to be structurally sound for use as the trough 12.

In accordance with another aspect of the invention, the natural bast fibers can be blended with modified polypropylene fibers (Polypropylene with Maleic Anhydride grafted Polypropylene, referred to hereafter as PP with MAPP). The blended proportion of fibers of PP with MAPP can be between about 25%-60% based on the final structural properties required, and in one example, 50% PP with MAPP was used with 50% kenaf fibers. The addition of the MAPP to PP fibers helps to increase the bond strength between the bast fibers and polypropylene fibers. Maleic anhydride provides polarity and reactivity which gives the high adhesion needed, since cellulosic fibers are polar and hydrophilic whereas PP is non-polar and hydrophobic. The MAPP makes some hydrogen or covalent bonds with the —OH group of the cellulose, and it also acts as a compatibilizer and provides a polar interaction between the cellulose and PP, which increases the structural integrity and strength of the nonwoven wall 14, while the increased molecular weight of the modified PP increases the flexural strength of the wall 14.

In manufacture, the PP with MAPP fibers and bast fibers are first blended together and then the blended mixture is preferably processed through a fine opener, which helps to make the blended mixture more homogenous and also helps to open the fiber strands into individual fibers.

The blended mixture is then processed through a web forming machine to form a nonwoven web, wherein the surface area weight of the web can be between about 300 gsm-5000 grams-per-square meter (gsm), wherein a wall 14 of about 1200 gsm has been found suitable to interior trim panel test requirements of most vehicle interior trim applications. The fibrous web can then be bonded via one of two processes to form nonwoven wall 14. The first includes bonding the web thermally by miming the web through an air oven where the temperature of the oven is set to melt or at least partially melt the thermoplastic fibers, including PP, PE or PP/MAPP, to bond the melted thermoplastic fibers with the natural cellulosic fibers.

The nonwoven layer is then cut to size, heated to above the melting temperature of the thermoplastic fibers, and then compression molded to take on the finished shape conforming substantially to the finish shaped of the trough 12. Upon being compression molded, the finished thickness of the trough can be uniform, or varied, as discussed above. In accordance with one embodiment of a trough, the finished thickness can be between about 1-3 mm, and the finished density can be about 30-60% of the known injection molded parts made of polypropylene, which when compared to injection molded products of the same size, saves about 1 Kg or more per vehicle.

Figure 2A:
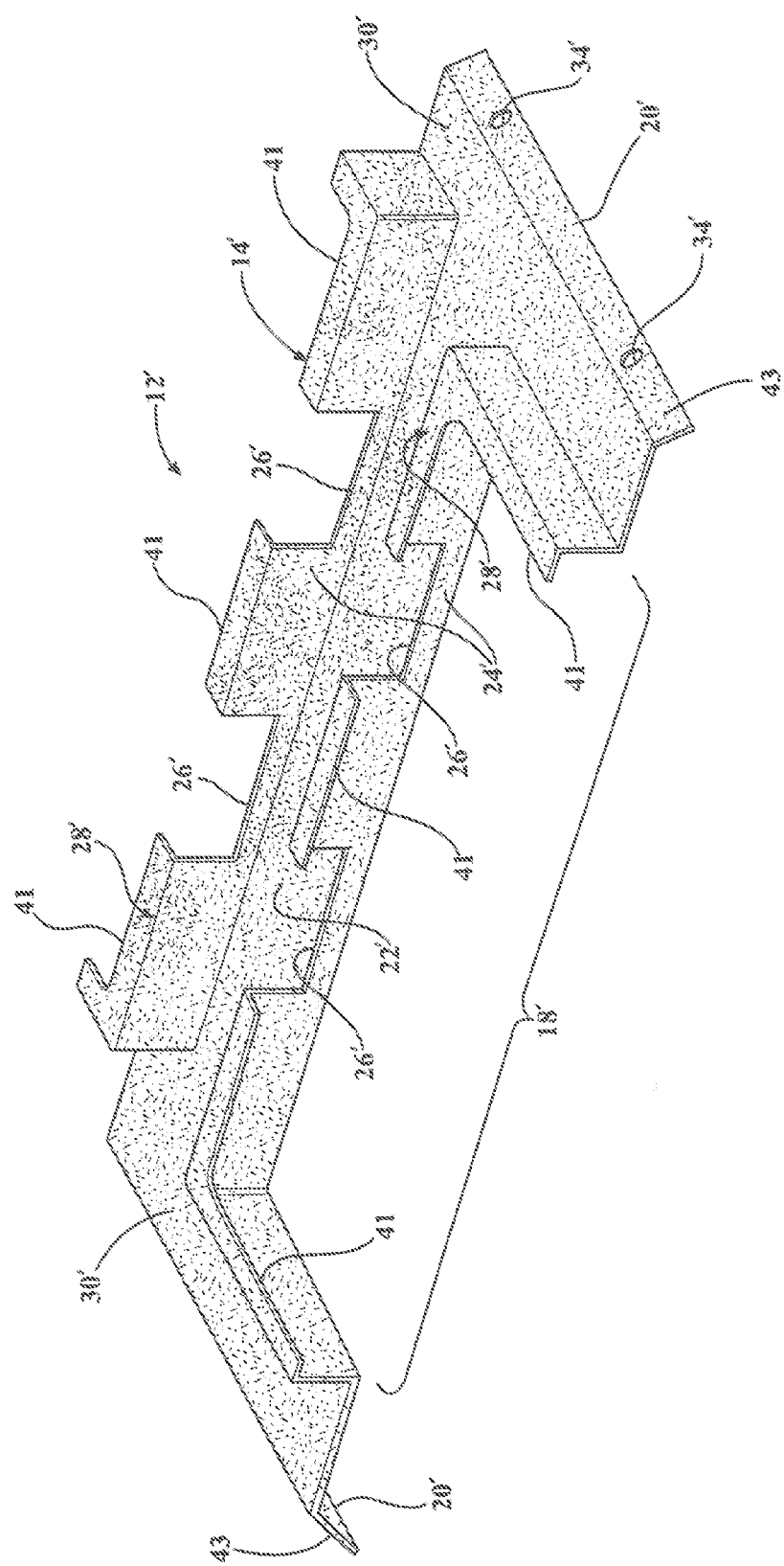
FIG. 2A is a view similar to FIG. 2 of a trough constructed in accordance with another aspect of the invention.

FIG. 2A illustrates a trough 12' constructed in accordance with another aspect of the invention, wherein the same reference numerals as used above, primed, are used to identify like features.

The trough 12' has a nonwoven wall 14' constructed from a selection of the same materials as discussed above, and so no further detail is believed necessary with regard to the material composition of the wall 14'. The wall 14' is formed as discussed above, having a mid-portion 18' which extends longitudinally between a pair of opposite free ends 20'. The mid-portion 18' is generally U-shaped as viewed in lateral cross-section having a base 22' and a pair of generally parallel sidewalls 24' with notches 26'. The sidewalls 24', rather than terminating at upwardly extending free top edges, are shown as having lips 41 extending laterally outward from edges 28'. It should be recognized that the lips 41 can be formed to extend inwardly, if desired. The lips 41 function, at least in part, to provide enhanced structural stiffness and rigidity to the trough 12'. The enhanced stiffness and rigidity is provided in axial and lateral bending directions, as well as in a torsional, twisting direction. The lips 41 are shown as extending along the entirety of the sidewalls 24', though it should be recognized that the lips 41, or portions thereof, can be omitted from selected regions, if desired, to increase the axial, lateral, and torsional flexibility of the trough in chosen regions, which could facilitate routing the trough during assembly to the vehicle. It should also be recognized that the thickness of the lips 41 can be compression molded as desired, wherein the thicknesses can be the same throughout, or different from one lip to another, or further varying in thickness throughout a single lip, depending on the stiffness attributes desired.

As discussed above for the through 12, the trough 12' includes flanges 30'; however, the flanges 30' are configured differently than shown for trough 12. The flanges 30' are shown to extend immediately adjacent the free ends 20', and include bent portions 43 that extend to the free ends 20', with the bent portions 43 including apertures 34' for receipt of fasteners. The bent portions 43, as discussed for the lips 41, can enhance structural stiffness and rigidity. It should be recognized that the flanges 30' and bent portions 43 thereof, if provided, can be formed having any suitable geometry, given the ability to readily cut and thermally mold the thermoplastic material of the nonwoven wall 14'. This flexibility in design applies to all features of the troughs of the present invention, thereby allowing the axial, lateral and torsional flexural stiffness and rigidity to be precisely provided, as desired, for the intended application. Accordingly, the troughs discussed herein, as well as their methods of construction, facilitate incorporating the troughs into any application, regardless of the physical and envelope requirements of the application.

FIG. 4 illustrates a nonwoven layer 114 in accordance with another aspect of the invention, wherein the same reference numerals as used above, offset by a factor of 100, are used to identify like features. The nonwoven layer 114 can be laminated with a layer 38, which can be another nonwoven thermoplastic scrim, such as a polypropylene scrim, a thermo-bonded thermoplastic scrim, such as PP, PE or PET, or a combination thereof, or an extruded thermoplastic sheet or film of PE or PP. The second process includes bonding the nonwoven web mechanically by needling the web to entangle the fibers with one another to form the nonwoven layer 114. At this point, the thermoplastic layer 38 can be needled to the wall 114. Then, the resulting needled layers can further be thermoformed, as discussed above. Otherwise, the thermoplastic layer 38 can be otherwise laminated to the needled nonwoven mat 114, such as via melting, adhesive, or otherwise.

FIG. 5 illustrates a nonwoven wall 214 in accordance with another aspect of the invention, wherein the same reference numerals as used above, offset by a factor of 200, are used to identify like features. The nonwoven wall 214 is constructed having a layer 238 formed of the same material discussed above for the layer 38, however, rather than being on an outer surface of the nonwoven wall 214, the layer 238 is sandwiched between a pair of nonwoven walls 214. Each of the walls 214 is constructed as discussed above for the wall 14, however, their individual thicknesses are reduced and their individual densities are reduced, such as to about 600 gsm, thereby forming the composite nonwoven wall 214 having a total of about 1200 gsm.

Figure 6:
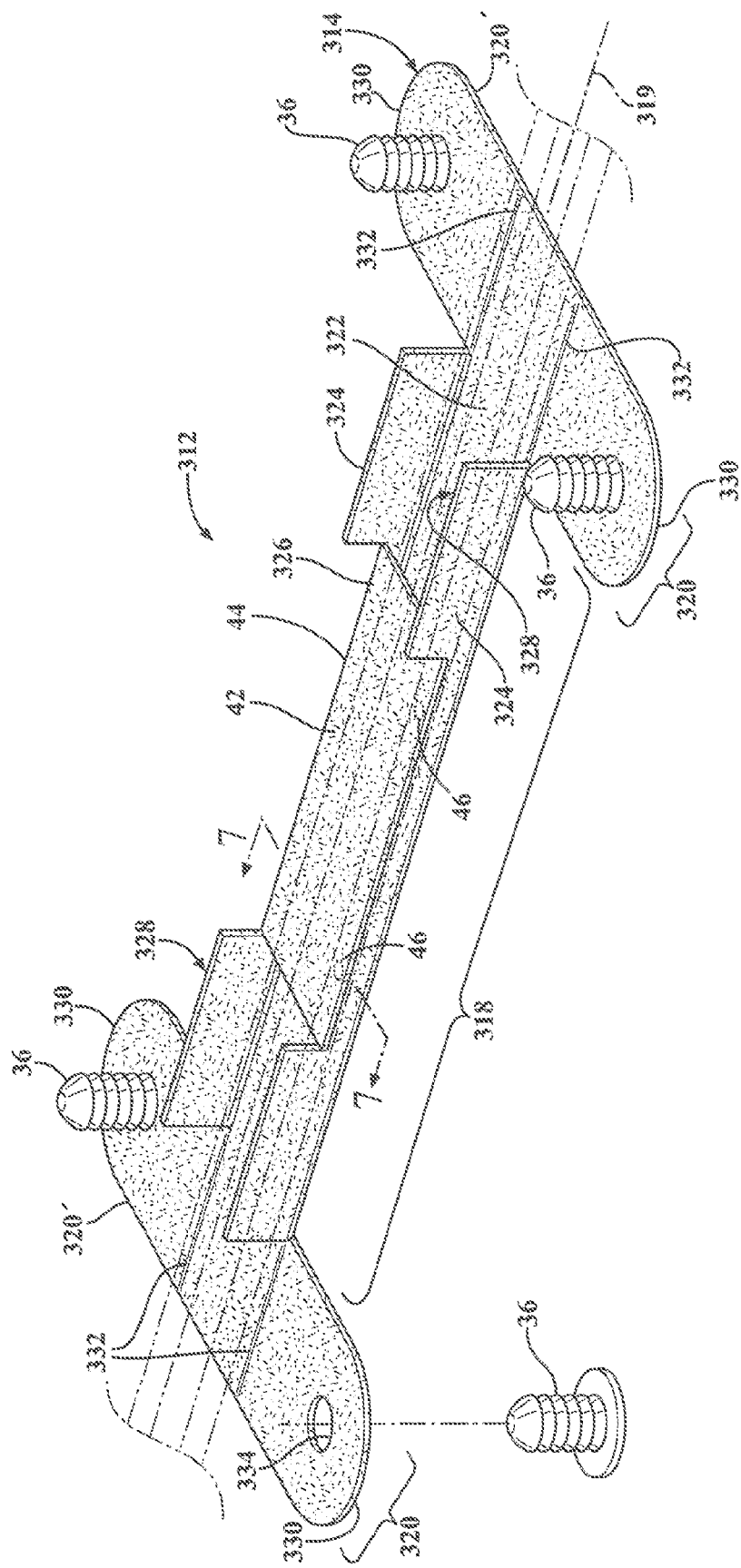
FIG. 6 is a perspective view of a trough constructed in accordance with another aspect of the invention.

FIG. 6 illustrates a trough 312 constructed in accordance with another aspect of the invention, wherein the same reference numerals as used above, offset by a factor of 300, are used to identify like features.

The trough 312 has a nonwoven wall 314 constructed from a selection of the same materials as discussed above, and so no further detail is believed necessary with regard to the material composition of the wall 314. The wall 314 is formed having a mid-portion 318 which extends longitudinally along a longitudinal axis 319 between a pair of end portions 320, which are located immediately adjacent opposite free ends 320' of the end portions 320. The mid-portion 318 is generally U-shaped as viewed in lateral cross-section having a base 322 and a pair of generally parallel sidewalls 324. The sidewalls 324, rather than having notches as discussed above for the trough 12, are formed to accommodate a cover portion 42 of the wall 314, wherein the cover portion 42 is formed as a monolithic piece of material with the wall 314 to fully enclose at least a portion of the through channel 313.

Figure 7:
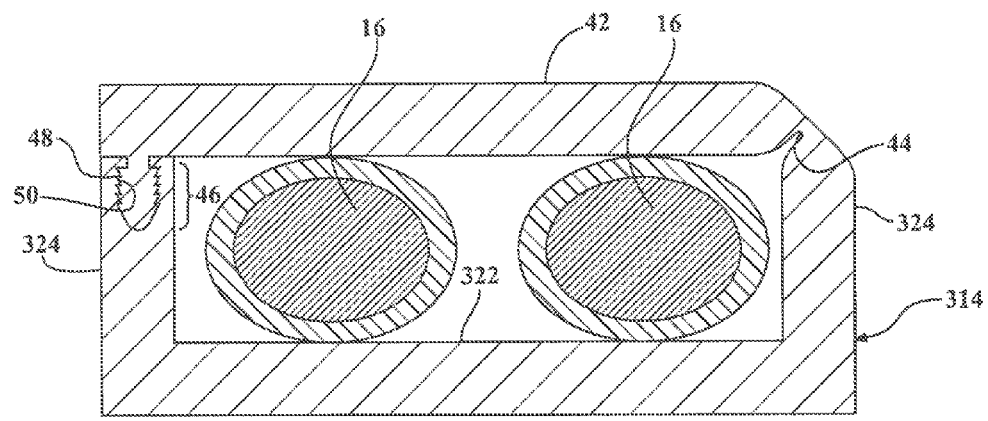
FIG. 7 is a cross-sectional view taken generally along the line 7-7 of FIG. 6.

The cover portion 42 functions to protect the elongate member(s) received in the through channel 313 of the trough 312 against damage, such as might occur if something were to penetrate a layer of material overlying the trough 312, such as a layer of vehicle carpet, by way of example and without limitation. The cover 42 is shown in FIG. 7 as being attached to one sidewall 324 via a living hinge 44 to facilitate opening and closing the cover 42, and to maintain the cover 42 in fixed attachment with the trough 312. Further, to facilitate maintaining the cover 42 in its closed position, a fastener 46 is provided to releasably fix the cover 42 in its closed position. By way of example and without limitation, the fastener 46 is shown as including a first or male fastener portion 48 formed as a monolithic protrusion of the nonwoven material of the wall 314, shown as being formed as a part of the cover 42, and a second or female fastener portion 50 formed as a recess or receptacle in the nonwoven material of the wall 314, shown as being formed as a part of one of the side walls 324 against which a free end of the cover 42 abuts. The male and female portions 48, 50 are formed in the compression molding process, and thus, are generally rigid. By being able to forming the fastener 46 as a wholly integral component of the wall 314, no secondary fastening mechanisms are needed. It should be understood that in addition to protecting the elongate member(s) against damage, the cover 42 can also function to maintain the elongate member(s) against movement within the trough 312, as best shown in FIG. 7 wherein the cover 42 is shown as coming into at least slightly sandwiched contact with the elongate members 16, thereby inhibiting or preventing vibration of the elongate member(s) within the trough 312, thus, eliminating a potential source for noise.

As discussed above for the through 12, each of the end portions 320 can include flanges 330 which extend laterally outwardly and are hingedly connected with the end portions 320 via reduced thickness living hinges 332, and thus, the flanges 330 are able to be freely flexed and pivoted, thereby facilitating attachment of the flanges 330 to the respective vehicle body panel or member. Each of the flanges 330 can have an aperture 334 for receiving a connecting device or fastener 36 for attaching the trough 312 to a panel or member of the vehicle.

FIG. 8 illustrates a trough 412 constructed in accordance with another aspect of the invention, wherein the same reference numerals as used above, offset by a factor of 400, are used to identify like features.

The trough 412 has a nonwoven wall 414 constructed from a selection of the same materials as discussed above, and so no further detail is believed necessary with regard to the material composition of the wall 414. The wall 414 is formed having a mid-portion 418 which extends in non-linear fashion, shown as being generally L-shaped, though any angle of bend is contemplated, between a pair of end portions 420. The mid-portion 418 has a generally U-shaped channel 413 as viewed in lateral cross-section having a base 422 and a pair of generally parallel sidewalls 424. The mid-portion 418 is shown as having a combination of features discussed above with regard to trough 12 and trough 112, including notches 426 and a cover portion 442 including integral fasteners 446, wherein the notches 426 and the cover portion 442 are formed and function as discussed above.

FIG. 9 illustrates a trough 512 constructed in accordance with another aspect of the invention, wherein the same reference numerals as used above, offset by a factor of 500, are used to identify like features.

The trough 512 is similar to the trough 412, including a nonwoven wall 514 constructed from a selection of the same materials as discussed above. The wall 514 is formed having a mid-portion 518 which extends in non-linear fashion, shown as being generally L-shaped, though any angle of bend is contemplated, between a pair of end portions 520. The mid-portion 518 has a generally U-shaped channel 513 as viewed in lateral cross-section having a base 522 and a pair of generally parallel sidewalls 524. The mid-portion 518 is shown as having a combination of features discussed above with regard to trough 12 and trough 312, including notches 526 and a cover portion 542 including integral fasteners 546, wherein the notches 526 and the cover portion 542 are formed and function as discussed above. The notable difference between trough 512 and trough 414 is with regard to the respective mid-portions 418, 518, wherein the base 422 of the mid-portion 418 is generally planar, while the base 522 of the mid-portion 518 extends over compound planes P1, P2, with the different planes P1, P2 being capable of being thermoformed having any desired relative angle of inclination to one another.

FIG. 10 illustrates a trough 612 constructed in accordance with another aspect of the invention, wherein the same reference numerals as used above, offset by a factor of 400, are used to identify like features.

The trough 612 has similar features to the trough 412, including a nonwoven wall 614 constructed from a selection of the same materials as discussed above. The notable difference with the trough 612 is that the wall 614 is formed to provide a plurality of through channels 613, shown a three, by way of example and without limitation. The three through channels 613 of the trough 612 are formed having a generally Y-shaped configuration, though any configuration is made possible via the thermoforming process used to form the trough 612. One of the through channels 613 is shown as having a cover portion 642 attached to the wall 614 as a monolithic piece of material via a living hinge 644 and including integral fasteners 646, while the other two through channels 613 are shown as being upwardly open and having notches 626, wherein the cover portion 642 and notches 626 are formed and function as discussed above. In addition, the trough 612 has a plurality of flanges, with at least some of the flanges, shown as two pair of flanges 630, being formed as monolithic pieces of material with the nonwoven wall 614 as discussed above; with at least some other of the flanges, shown as a single pair of flanges 630 being formed from a piece of material separate from the nonwoven wall 614. The flanges 630' are preferably formed from thermoplastic material, wherein the thermoplastic material can be provided as a single piece of material that is cut to the desired configuration of the flanges 630, and then, the pre-formed piece of material can be disposed within a cavity of the mold used to thermoform the nonwoven wall 614, wherein during the thermoforming operation, the thermoplastic material of the flanges 630' is bonded to the thermoplastic material of the nonwoven wall 614. It should be recognized that the flanges 630' could be located within the mold to extend from any region of the trough 612 as desired, depending on the application requirements. Other features are also shown, such as the fasteners 36 used to attach the trough 612 to a vehicle member, wherein the fasteners 36 are shown as being disposed through apertures in flanges 630, 630' as discussed above.

Figure 11:
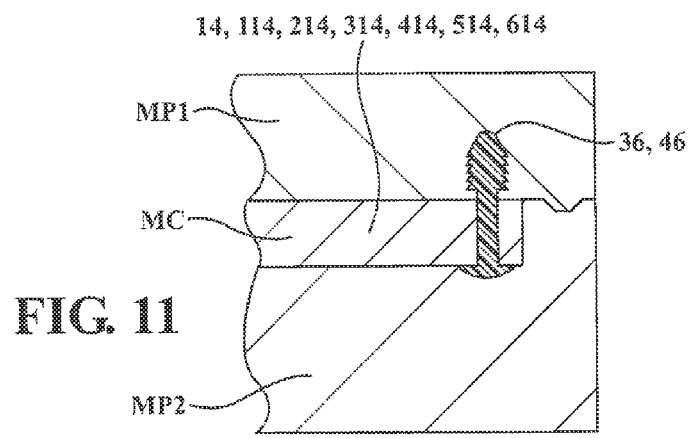
FIG. 11 is a cross-sectional view of a nonwoven wall of a trough and a fastener therefor being bonded to one another in accordance with another aspect of the invention.

FIG. 11 illustrates another aspect of the invention, showing a fastener, such as a fastener 36 used to fix the trough to the vehicle and/or a fastener 46 used to releasably maintain a cover 42, 442, 542, 642 in a closed position. The respective fastener 36, 46 can be formed from a thermoplastic material, wherein the fastener 36, 46 can be disposed with a mold cavity MC between a pair of mold parts MP1, MP2, and during the compression molding process, the fastener 36, 46 can be bonded to the thermoformable nonwoven material of the respective nonwoven wall, thereby bonding and fixing the fastener 36, 46 to the resulting thermoformed trough. As a result, the fastener 36, 46 is maintained in fixed, bonded attachment to the nonwoven wall of the trough, thereby preventing the fastener 36, 46 from being dislodged from the respective opening during assembly, and further doing away with the need to supply separate fasteners during assembly.

Many modifications and variations of the present invention are possible in light of the above teachings. It is, therefore, to be understood that the invention may be practiced otherwise than as specifically described, and that the scope of the invention is defined by any ultimately allowed claims.

What is claimed is:

1. A method of constructing a nonwoven trough, comprising:
    blending natural cellulosic fibers and thermoplastic fibers together to form a mixture;
    forming at least one nonwoven web from the mixture;
    compression molding the at least one nonwoven web to form at least one nonwoven wall extending along a longitudinal axis, said at least one nonwoven wall having a midsection and opposite end portions and having a base and a pair of sidewalls extending upwardly from said base to provide said midsection with a generally U-shaped cross-section taken generally transversely to said longitudinal axis;
    forming at least one flange extending laterally outwardly from the base and configuring the at least one flange for attachment to a vehicle member; and
    further including bonding a scrim layer to an outer surface of the at least one nonwoven wall and diffusing the scrim layer into the at least one nonwoven wall to form an alloy region containing material of both the at least one nonwoven wall and the scrim layer.

2. The method of claim 1 further including bonding a fastener to said at least one laterally extending flange during the compression molding.

3. The method of claim 1 further including forming a living hinge extending between said at least one flange and said base.

4. The method of claim 3 further including forming the living hinge having a thickness that is less than a thickness of said flange and said base.

5. The method of claim 1 further including providing the natural cellulosic fibers including kenaf and the thermoplastic fibers including at least one of polypropylene or polyethylene.

6. The method of claim 1 further including forming the at least one nonwoven wall having regions of varying thickness.

7. The method of claim 1 further including sandwiching the scrim layer between a pair of the at least one nonwoven wall and diffusing the scrim layer into each of the nonwoven walls to form a pair of alloy regions on opposite sides of the scrim layer, the alloy regions containing material from separate ones of the nonwoven walls and the scrim layer.

8. The method of claim 1 further including forming a cover attached to one of the sidewalls and configuring the cover to extend over the base into abutment with an opposite one of the sidewalls.

9. The method of claim 8 further including forming a living hinge between the cover and the one sidewall to which the cover is attached.

10. The method of claim 8 further including forming a fastener having at least a portion formed as a monolithic piece of material with at least one of the cover and the sidewall against which the cover abuts, and configuring the portion of the fastener to be fastened to the other of the cover or the sidewall to against which the cover abuts.

11. The method of claim 10 further including forming the fastener having a male fastener portion formed as a monolithic piece of material with one of the cover and the sidewall against which the cover abuts and forming the fastener having a female fastener portion formed as a monolithic piece of material with the other the cover and the sidewall against which the cover abuts.

12. The method of claim 1 further including forming a lip extending outwardly from at least one of the sidewalls.

13. The method of claim 1 further including bonding at least one of said at least one flange to the base during the compressing molding.

14. A method of constructing a nonwoven trough, comprising:
    forming at least one nonwoven wall having a base extending along a longitudinal axis from a mixture of natural cellulosic fibers and thermoplastic fibers;
    forming at least one flange extending laterally outwardly from said base and configuring said at least one flange for attachment to a vehicle member; and
    bonding a scrim layer to an outer surface of said at least one nonwoven wall and diffusing material of said scrim layer into said nonwoven wall to form an alloy region containing material of both said at least one nonwoven wall and said scrim layer.

15. The method of claim 14 further including forming said base having a midsection and opposite end portions and forming said midsection having at least one sidewall extending upwardly from said base.

* * * * *